(12) United States Patent
Shirotori et al.

(10) Patent No.: US 7,826,176 B2
(45) Date of Patent: Nov. 2, 2010

(54) MAGNETIC RECORDING MEDIUM WITH THICKER PROTECTIVE FILM IN EDGE AREAS AND MAGNETIC RECORDING APPARATUS USING THE MEDIUM

(75) Inventors: Satoshi Shirotori, Fuchu (JP); Masatoshi Sakurai, Tokyo (JP); Akira Kikitsu, Yokohama (JP); Yoshiyuki Kamata, Tokyo (JP); Kaori Kimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 799 days.

(21) Appl. No.: 11/723,977

(22) Filed: Mar. 22, 2007

(65) Prior Publication Data
US 2007/0230055 A1 Oct. 4, 2007

(30) Foreign Application Priority Data
Mar. 30, 2006 (JP) .............................. 2006-094356

(51) Int. Cl.
*G11B 5/72* (2006.01)
*G11B 5/82* (2006.01)
(52) U.S. Cl. ...................... 360/135; 428/833.2; 428/834
(58) Field of Classification Search ................. 360/135; 428/833, 833.1, 833.2, 834, 835
See application file for complete search history.

(56) References Cited

U.S. PATENT DOCUMENTS

| | | | |
|---|---|---|---|
| 3,627,330 A | 12/1971 | Dimitracopoulos | |
| 4,396,479 A | 8/1983 | Jones | |
| 4,647,494 A | 3/1987 | Meyerson et al. | |
| 4,701,374 A | 10/1987 | Sagoi et al. | |
| 4,935,278 A | 6/1990 | Krounbi et al. | |
| 5,192,697 A | 3/1993 | Leong | |
| 5,402,278 A | 3/1995 | Morita | |
| 5,497,085 A | 3/1996 | Tian et al. | |
| 5,535,069 A | 7/1996 | Chiao et al. | |
| 5,766,718 A | 6/1998 | Matsuda et al. | |
| 5,771,131 A | 6/1998 | Pirzadeh | |

(Continued)

FOREIGN PATENT DOCUMENTS

CN 1360304 7/2002

(Continued)

OTHER PUBLICATIONS

Hattori et al., *Fabrication of Discrete Track Perpendicular Media of High Recording Density*, IEEE Transactions on Magnetics, vol. 40, No. 4, Jul. 2004, pp. 2510-2515.

(Continued)

*Primary Examiner*—Craig A. Renner
(74) *Attorney, Agent, or Firm*—Nixon & Vanderhye, PC (57) ABSTRACT

A magnetic recording media includes a toroidal substrate, a surface thereof is divided into a recording area located in a central part between an outer peripheral edge and an inner peripheral edge, edge areas located within 100 μm or more and 2,000 μm or less from the outer and inner peripheral edges, respectively, and adjacent areas located between the edge areas and the recording area, respectively, a magnetic film on the substrate, and a protective film on the magnetic film, in which the magnetic film is thinner in the edge areas than that in the adjacent areas, and at least a part of the protective film in the edge areas is thicker than that in the adjacent areas.

8 Claims, 5 Drawing Sheets

U.S. PATENT DOCUMENTS

| | | | |
|---|---|---|---|
| 5,772,905 A | 6/1998 | Chou | |
| 5,943,180 A | 8/1999 | Seo et al. | |
| 6,104,578 A | 8/2000 | Kitazaki et al. | |
| 6,153,281 A | 11/2000 | Meyer et al. | |
| 6,168,845 B1 | 1/2001 | Fontana, Jr. et al. | |
| 6,187,413 B1 | 2/2001 | Kuo et al. | |
| 6,254,966 B1 | 7/2001 | Kondo | |
| 6,331,364 B1 | 12/2001 | Baglin et al. | |
| 6,365,012 B1 | 4/2002 | Sato et al. | |
| 6,426,845 B1 | 7/2002 | Sacks et al. | |
| 6,469,852 B1 | 10/2002 | Nakagawa | |
| 6,602,620 B1 | 8/2003 | Kikitsu et al. | |
| 6,641,935 B1 | 11/2003 | Li et al. | |
| 6,689,495 B1 | 2/2004 | Sato et al. | |
| 6,751,035 B1 | 6/2004 | Belser | |
| 6,753,043 B1 | 6/2004 | Kuo et al. | |
| 6,753,130 B1 | 6/2004 | Liu et al. | |
| 6,875,492 B1 | 4/2005 | Pirzada et al. | |
| 7,050,248 B1 | 5/2006 | Wang | |
| 7,112,376 B2 | 9/2006 | Moriwaki et al. | |
| 7,209,413 B2 | 4/2007 | Van Der et al. | |
| 7,323,258 B2 | 1/2008 | Kamata et al. | |
| 7,345,838 B2 | 3/2008 | Sakurai et al. | |
| 7,385,785 B2 | 6/2008 | Hattori et al. | |
| 7,388,725 B2 | 6/2008 | Sakurai et al. | |
| 7,572,528 B2 | 8/2009 | Yamamoto et al. | |
| 7,625,645 B2 | 12/2009 | Kikitsu et al. | |
| 2001/0048566 A1 | 12/2001 | Hirano et al. | |
| 2002/0081461 A1 | 6/2002 | Nishikawa et al. | |
| 2002/0142192 A1 | 10/2002 | Kamata et al. | |
| 2002/0150794 A1 | 10/2002 | Hamada et al. | |
| 2002/0182443 A1 | 12/2002 | Ohkubo | |
| 2003/0035973 A1 | 2/2003 | Trindade et al. | |
| 2004/0050480 A1 | 3/2004 | Angelo et al. | |
| 2004/0091748 A1 | 5/2004 | Kamata et al. | |
| 2004/0166372 A1 | 8/2004 | Haginoya et al. | |
| 2004/0174636 A1 | 9/2004 | Suzuki et al. | |
| 2004/0191577 A1 | 9/2004 | Suwa et al. | |
| 2004/0247945 A1 | 12/2004 | Chen et al. | |
| 2004/0253817 A1 | 12/2004 | Imada et al. | |
| 2004/0257687 A1 | 12/2004 | Ishida et al. | |
| 2005/0003106 A1 | 1/2005 | Isozaki | |
| 2005/0013047 A1 | 1/2005 | Takai et al. | |
| 2005/0045583 A1 | 3/2005 | Fujita et al. | |
| 2005/0117253 A1 | 6/2005 | Moriya et al. | |
| 2005/0219730 A1 | 10/2005 | Sakurai et al. | |
| 2005/0233176 A1 | 10/2005 | Takai et al. | |
| 2005/0282038 A1 | 12/2005 | Yamamoto et al. | |
| 2006/0012913 A1 | 1/2006 | Nakamura et al. | |
| 2006/0014053 A1 | 1/2006 | Asakura et al. | |
| 2006/0028750 A1 | 2/2006 | Sakurai et al. | |
| 2006/0076509 A1 | 4/2006 | Okino et al. | |
| 2006/0132953 A1 | 6/2006 | Asakura et al. | |
| 2006/0172153 A1 | 8/2006 | Kikitsu et al. | |
| 2006/0215306 A1 | 9/2006 | Ehrlich et al. | |
| 2006/0222897 A1 | 10/2006 | Kamata et al. | |
| 2006/0269796 A1 | 11/2006 | Hyodo | |
| 2006/0280861 A1 | 12/2006 | Shirotori et al. | |
| 2007/0053107 A1 | 3/2007 | Kimura et al. | |
| 2007/0070547 A1 | 3/2007 | Kamata et al. | |
| 2007/0190365 A1 | 8/2007 | Kodama et al. | |
| 2007/0207263 A1 | 9/2007 | Hieda et al. | |
| 2008/0193801 A1 | 8/2008 | Haneda et al. | |
| 2008/0241595 A1 | 10/2008 | Kimura et al. | |

FOREIGN PATENT DOCUMENTS

| | | |
|---|---|---|
| CN | 1558399 | 12/2004 |
| CN | 1637870 | 7/2005 |
| EP | 0 183 427 | 6/1986 |
| EP | 0 339 813 | 11/1989 |
| EP | 0 339 851 | 11/1989 |
| EP | 0 459 265 | 12/1991 |
| EP | 0 468 778 | 1/1992 |
| EP | 0 538 887 | 4/1993 |
| EP | 0 730 266 | 9/1996 |
| EP | 1 434 211 | 6/2004 |
| EP | 1463038 | 9/2004 |
| JP | 58-118028 | 7/1983 |
| JP | 62-232720 | 10/1987 |
| JP | 62-256225 | 11/1987 |
| JP | 02-232816 | 9/1990 |
| JP | 2-301018 | 12/1990 |
| JP | 3-142707 | 6/1991 |
| JP | 04-001922 | 1/1992 |
| JP | 04-113515 | 4/1992 |
| JP | 05-151738 | 6/1993 |
| JP | 05-258291 | 10/1993 |
| JP | 6-28650 | 2/1994 |
| JP | 06-036263 | 2/1994 |
| JP | 06-076278 | 3/1994 |
| JP | 06-139567 | 5/1994 |
| JP | 07-085406 | 3/1995 |
| JP | 07-153047 | 6/1995 |
| JP | 08-069614 | 3/1996 |
| JP | 08-115519 | 5/1996 |
| JP | 08-124340 | 5/1996 |
| JP | 8-209352 | 8/1996 |
| JP | 08-241512 | 9/1996 |
| JP | 08-255340 | 10/1996 |
| JP | 9-97419 | 4/1997 |
| JP | 09-167305 | 6/1997 |
| JP | 09-245345 | 9/1997 |
| JP | 10-334460 | 12/1998 |
| JP | 11-161943 | 6/1999 |
| JP | 11-161944 | 6/1999 |
| JP | 11-273059 | 10/1999 |
| JP | 11-274152 | 10/1999 |
| JP | 11-348048 | 12/1999 |
| JP | 2000-211082 | 8/2000 |
| JP | 2000-269330 | 9/2000 |
| JP | 2000-285538 | 10/2000 |
| JP | 2000-306227 | 11/2000 |
| JP | 2001-273682 | 10/2001 |
| JP | 2002-288813 | 10/2002 |
| JP | 2003-016621 | 1/2003 |
| JP | 2003-100609 | 4/2003 |
| JP | 2003-109210 | 4/2003 |
| JP | 2003-109213 | 4/2003 |
| JP | 2003-155365 | 5/2003 |
| JP | 2004-164692 | 6/2004 |
| JP | 2004-234826 | 8/2004 |
| JP | 2004-288250 | 10/2004 |
| JP | 2004-295989 | 10/2004 |
| JP | 2004-295991 | 10/2004 |
| JP | 2005-011459 | 1/2005 |
| JP | 2005-038476 | 2/2005 |
| JP | 2005-56535 | 3/2005 |
| JP | 2005-243086 | 9/2005 |
| JP | 2005-243131 | 9/2005 |
| JP | 2005-276325 | 10/2005 |
| JP | 2005-293633 | 10/2005 |
| JP | 2006-048861 | 2/2006 |
| JP | 2006-331578 | 12/2006 |
| JP | 2007-66475 | 3/2007 |
| WO | 02/23538 | 3/2002 |

OTHER PUBLICATIONS

Office Action in Japanese Application 2006-094356, dated May 12, 2009 and English-language translation thereof.

U.S. Appl. No. 11/406,502, filed Apr. 19, 2006 to Shirotori et al. titled "Method for Producing Magnetic Recording Medium".

MAGNETIC RECORDING MEDIUM WITH THICKER PROTECTIVE FILM IN EDGE AREAS AND MAGNETIC RECORDING APPARATUS USING THE MEDIUM

CROSS-REFERENCE TO RELATED APPLICATIONS

This application is based upon and claims the benefit of priority from prior Japanese Patent Application No. 2006-094356, filed Mar. 30, 2006, the entire contents of which are incorporated herein by reference.

BACKGROUND OF THE INVENTION

1. Field of the Invention

The present invention relates to a magnetic recording media such as a discrete track media or a nano-patterned media, a method for manufacturing the same, and a magnetic recording apparatus.

2. Description of the Related Art

Recently, much attention has been paid to discrete track media and nano-patterned media which are configured as described below in order to address to the increased density of magnetic recording media. In discrete track media, adjacent recording tracks are separated from each other by a groove or a nonmagnetic material to reduce the magnetic interference between the recording tracks. In nano-patterned media, adjacent recording bits are separated from each other by a groove or a nonmagnetic material to reduce the magnetic interference between the recording bits. In the manufacture of such discrete track media or nano-patterned media, it is preferable to form magnetic patterns for data areas and for signals for servo areas by an imprint process using a stamper, since this method can eliminates the step of servo track write, leading to a reduced cost.

However, when a magnetic recording media manufactured using the imprint process is incorporated in a magnetic recording apparatus, recesses and protrusions on the surface of the media may disadvantageously make the flying property of the head unstable. Thus, there have not been established suitable manufacturing conditions for a method for manufacturing a magnetic recording media using the imprint process as well as suitable patterns to be formed and a processing method for a magnetic film.

Conventionally, a magnetic recording media has been proposed which has patterns of recesses and projections formed in at least either an outside area or inside area with respect to the data recording area to adjust lifting force applied to the magnetic head in order to improve the head flying property (JP-A 2005-38476 [KOKAI]). Further, a magnetic recording media has been proposed in which the surface heights of the protective film formed on the recording track areas and that formed on the separation areas separating the recording track areas are adjusted in order to prevent the head from stiction and to prevent the patterned structure from being easily destroyed (JP-A 2003-109210 [KOKAI]).

With a magnetic recording media manufactured using the imprint process, a diamond like carbon (DLC) film as a protective film may not be appropriately formed by chemical vapor deposition (CVD) because electrical conduction is not established successfully in the edge areas the substrate. Thus, if the DLC film is formed insufficiently thickly, for example, the protective film may be damaged by contact with the spindle when the media is being mounted on a drive, and further the magnetic film is corroded at the damaged portion of the protective film. However, no solution to these problems has been known so far.

BRIEF SUMMARY OF THE INVENTION

According to an aspect of the present invention, there is provided a magnetic recording media comprising: a toroidal substrate, a surface thereof is divided into a recording area located in a central part between an outer peripheral edge and an inner peripheral edge, edge areas located within 100 μm or more and 2,000 μm or less from the outer and inner peripheral edges, respectively, and adjacent areas located between the edge areas and the recording area, respectively; a magnetic film on the substrate; and a protective film on the magnetic film, wherein the magnetic film is thinner in the edge areas than that in the adjacent areas, and at least a part of the protective film in the edge areas is thicker than that in the adjacent areas.

According to another aspect of the present invention, there is provided a method for manufacturing a magnetic recording media, comprising: depositing a magnetic film on a toroidal substrate; forming a resist on the magnetic film except for an inner edge area within 100 μm or more and 2,000 μm or less from an inner peripheral edge of the substrate and edge-rinsing an outer edge area within 100 μm or more and 2,000 μm or less from the outer peripheral edge to remove the resist; carrying out imprinting with a stamper having patterns of recesses and protrusions to pattern the resist on a recording area located in a central part between the outer peripheral edge and inner peripheral edge of the substrate; etching a resist residue remaining in the recesses in the patterned resist; etching the magnetic film in the inner and outer edge areas and recording area using the protrusions of the patterned resist as a mask; and removing the patterned resist.

DETAILED DESCRIPTION OF THE INVENTION

Figure 1:
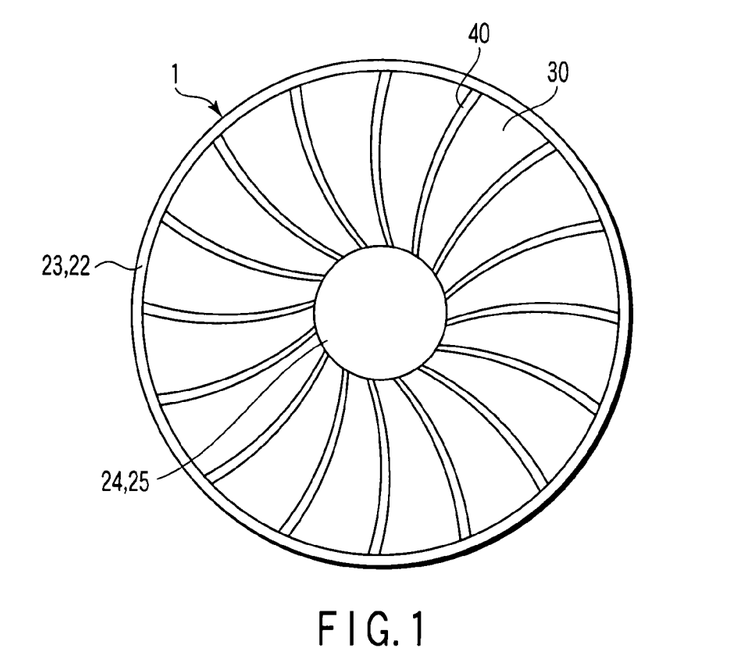
FIG. 1 is a plan view of a magnetic recording media according to an embodiment.
Figure 2:
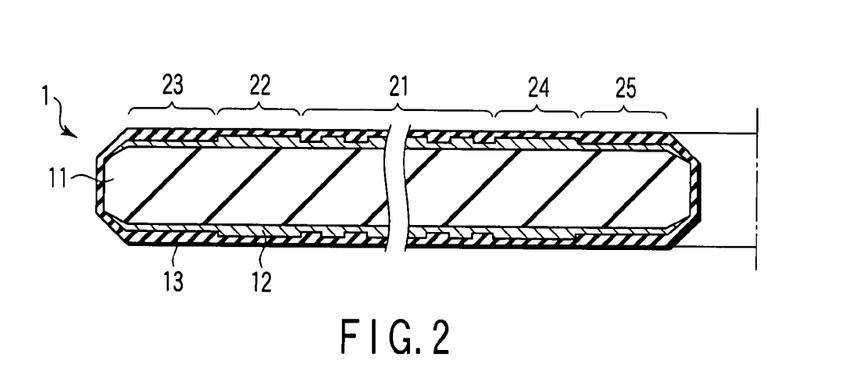
FIG. 2 is a cross-sectional view of the magnetic recording media according to the embodiment showing from the inner peripheral edge to the outer peripheral edge.

FIG. 1 shows a plan view of a magnetic recording media according to an embodiment. FIG. 2 shows an exemplary cross-sectional view of the area from the inner peripheral edge to outer peripheral edge of the magnetic recording media. As shown in FIG. 2, a magnetic recording media 1 has a magnetic film 12 and a protective film 13 on a toroidal substrate 11. FIG. 2 shows an example in which the magnetic film 12 and protective film 13 are formed on both surfaces of the substrate 11. However, the magnetic film 12 and protective film 13 may be formed on only one of the surfaces of the substrate 11.

Here, the surface of the magnetic recording media 1 is referred to as a plane on which information is recorded. As shown in FIGS. 1 and 2, the surface of the magnetic recording media 1 is divided into a recording area 21 located in a central part between the outer peripheral edge and the inner peripheral edge, an outer edge area 23, an inner edge area 25, an outer adjacent area 22 located between the outer edge area 23 and the recording area 21, and an inner adjacent area 24 located between the inner edge area 25 and the recording area 21.

The outer edge area 23 is formed within 100 μm or more and 2,000 μm or less of the outermost position of a flat part except for a chamfered part (tapered part) starting from the outer peripheral edge. The inner edge area 25 is formed within 100 μm or more and 2,000 μm or less of the innermost position of the flat part except for a chamfered part (tapered part) starting from the inner peripheral edge.

The outer edge area 23 and inner edge area 25 are specified to lie within the above ranges for the following reason. Substrate mounting eccentricity and motor eccentricity each of about 100 to 300 μm may occur during processing of a magnetic recording media. Accordingly, it is pointless to provide some functions within 100 μm of either the outermost or innermost position of the flat part. On the other hand, a load position for the head slider is set at about 2,000 μm from the outer peripheral edge. (Note that, this may vary depending on the substrate size). If the outer edge area 23 were formed at a position more than 2,000 μm from the outermost position of the flat part, the recording area would decrease.

The recording area 21 includes a data area 30 and a servo area 40 in both of which the magnetic film are formed into protrusion patterns. User data is recorded in the magnetic patterns in the data area 30. The data area 30 and the servo area 40 will be described below in detail.

No magnetic patterns are formed and no data is recorded in the outer adjacent area 22 and inner adjacent area 24.

The outer adjacent area 22 and inner adjacent area 24 will sometimes be collectively referred to as an adjacent area. The outer edge area 23 and inner edge area 25 will sometimes be collectively referred to as an edge area.

In the magnetic recording media according to the embodiment, the magnetic film 12 is thinner in the edge areas 23 and 25 than in the adjacent areas 22 and 24. At least a part of the protective film 13 in the edge areas 23 and 25 is thicker than the protective film 13 in the adjacent areas 22 and 24.

In the magnetic recording media according to the embodiment, the protective film 13 is thicker in the edge areas 23 and 25 than in the adjacent areas 22 and 24. This makes it possible to prevent the degradation of the protective film 13 resulting from its contact with the spindle when it is being mounted on a drive or processing damage during media production. This in turn makes it possible to prevent the corrosion of the magnetic film resulting from the degradation of the protective film. To exert this effect, the protective film is preferably thicker in the edge area than in the adjacent area by 10 nm or more. When the difference in thickness of the protective film is less than 10 nm, it is difficult to prevent the degradation of the protective film.

To make the protective film thicker in the edge area than in the adjacent area by 10 nm or more, the amount of the magnetic film to be etched in the edge area during the process of manufacturing a magnetic recording media should be set to 10 nm or more as described below.

On the other hand, in the conventional magnetic recording media, including discrete track media and nano-patterned media, the magnetic film and protective film have almost the same thickness in the edge area and in the adjacent area. To achieve high-density recording in a conventional magnetic media, the thickness of a protective film is set in a range of 1 to 10 nm, preferably 3 to 4 nm, to reduce the distance between the magnetic head and the magnetic film. However, a protective film that is thinner in the edge area is readily degraded by such causes described above.

In FIG. 2, the protective film 13 is formed to cover the edge areas 23 and 25 and the outer and inner chamfered parts (tapered parts). However, the form of the protective film 13 is not limited to this. For example, as is the case with a magnetic recording media according to another embodiment shown in FIG. 3, the thickness of the protective film 13 in the edge areas 23 and 25 may decrease toward the outer peripheral edge or inner peripheral edge.

In the embodiment, the protective film may be formed of one type of material or a stacked film of two or more types of materials. The uppermost layer of the protective film is preferably formed of carbon that is excellent in durability and corrosion resistance and is deposited by the chemical vapor deposition (CVD) process. Here, the carbon is classified into $sp^2$ bonded carbon (graphite) and $sp^3$ bonded carbon (diamond). The CVD process generates carbon on the basis of chemical reaction by exciting material gas in plasma to decompose the gas. Accordingly, optimized conditions enable the formation of diamond like carbon (DLC), which is rich in $sp^3$ bonded carbon. DLC is excellent in durability and corrosion resistance but is poor in flatness owing to replication of underlying patterns. On the other hand, carbon that is formed by sputtering using a graphite target is amorphous carbon containing a mixture of $sp^2$ bonded carbon and $sp^3$ bonded carbon and is excellent in flatness.

Consequently, to form a protective film using one type of material, DLC is preferably deposited by CVD. To form a protective film using a stacked film of two or more types of materials, amorphous carbon is preferably deposited by sputtering to form a lower protective film, followed by etching back, and then, DLC is deposited by the CVD process. Such a stacked protective film is excellent in flatness, durability, and corrosion resistance.

Figure 3:
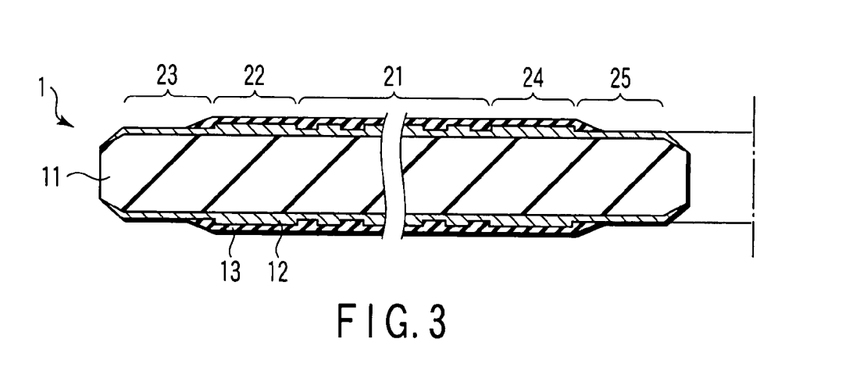
FIG. 3 is a cross-sectional view of a magnetic recording media according to another embodiment showing from the inner peripheral edge to the outer peripheral edge.

A possible material for the lower protective film may include an insulating film containing $SiO_2$ or $ZrO_2$. The insulating film such as $SiO_2$ can be deposited by sputtering under RF bias and exhibits excellent flatness. The insulating film thus enables the exertion of effects similar to those produced if amorphous carbon is used as the lower protective film. However, if an insulating film remains on the surface after the etch-back operation following the deposition of the insulating film such as $SiO_2$, electrical conduction is not established in deposition of DLC by CVD. This may degrade the quality of the DLC film. To avoid this problem in the case where the insulating film is used as a lower protective film, the lower protective film is etched back so that its thickness decreases toward the edge as shown in FIG. 3.

A lubricant is applied to the protective film 13 of the magnetic recording media. Examples of the lubricant include, for example, perfluoropolyether, fluorinated alcohol, and fluorinated carboxylic acid. The lubricant on the protective film 13 is divided into a bonding layer chemically bonded to the protective film 13 and a free layer not chemically bonded to the protective film 13. The better film quality of the protective film 13 in the edge area increases the rate of the bonding layer, with the free layer having a uniform film thickness. To measure the ratio of the bonding layer to free layer in the lubricant, it is possible to use X-ray photoelectron spectroscopy, electron spectroscopy for chemicals analysis (ESCA), a Fourier transformation infrared spectrophotometer (FT-IR), or the like.

Now, description will be given of structure of the recording area of magnetic recording media according to embodiments, taking the case of a discrete track (DTR) media, a discrete bit media, and a nano-patterned media.

Figure 4:
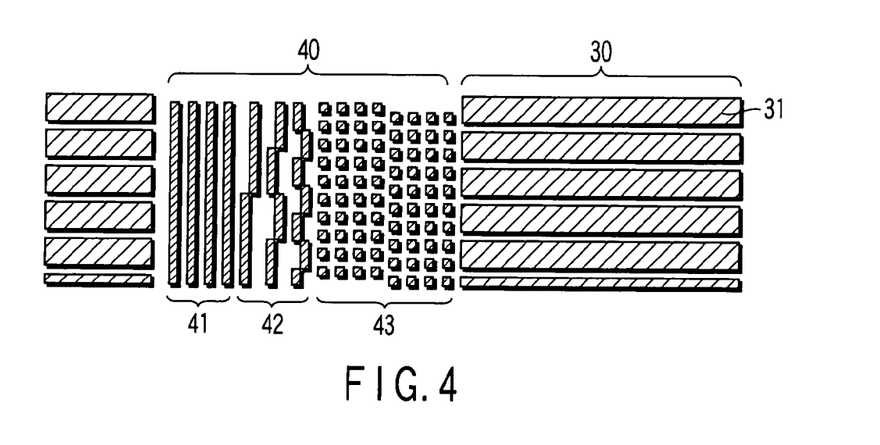
FIG. 4 is a plan view along a circumferential direction of a discrete track media according to another embodiment.

FIG. 4 shows a plan view of a discrete track media according to an embodiment as viewed along the circumferential direction of the media. The servo area 40 in FIG. 4 includes a preamble portion 41, an address portion 42, and a burst portion 43. The data area 30 in FIG. 4 includes discrete tracks 31.

Figure 5:
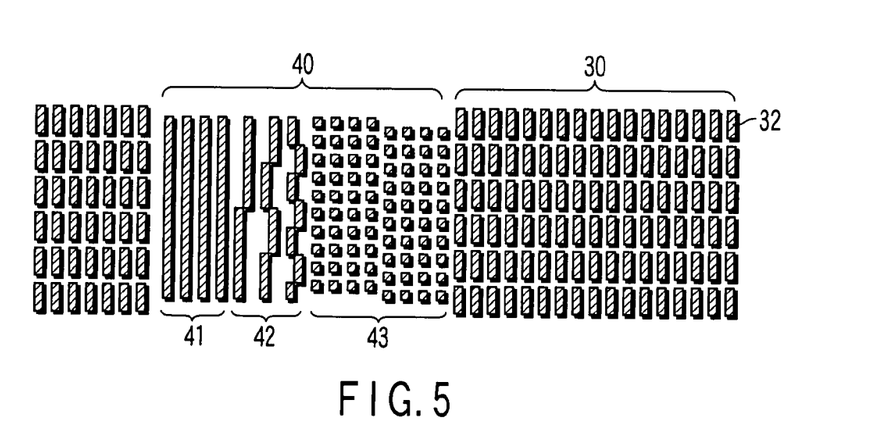
FIG. 5 is a plan view along a circumferential direction of a discrete bit media according to another embodiment.

FIG. 5 shows a plan view of a discrete bit media according to another embodiment as viewed along the circumferential direction of the media. In the data area 30 in FIG. 5, a ferromagnetic layer is physically divided into pieces not only in the cross-track direction but also in the down-track direction to form discrete bits 32.

Figure 6:
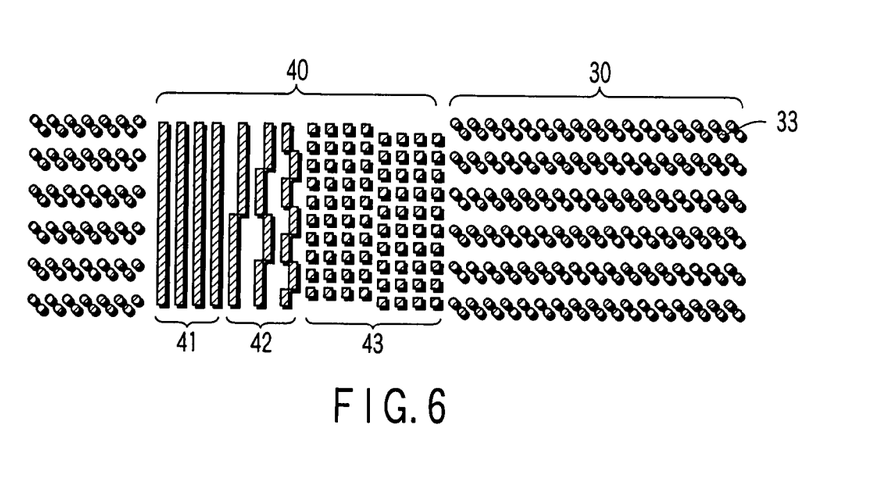
FIG. 6 is a plan view along a circumferential direction of a nano-patterned media according to another embodiment.

FIG. 6 shows a plan view of a nano-patterned media according to another embodiment as viewed along the circumferential direction of the media. Recording tracks in the data area 30 in FIG. 6 include two subtracks having magnetic dots 33 formed of protruding magnetic patterns arranged at a pitch P in the down-track direction. The magnetic dots 33 on one of the subtracks are shifted from the magnetic dots 33 on the other subtrack by the ½ pitch. These magnetic dots 33 can be formed using artificially assisted self-assembly (AASA), which involves subjecting diblock copolymer to phase separation to controllably array patterns.

With reference to FIGS. 7A, 7B, 7C, 7D, 7E, 8A, 8B, 8C, 8D, 8E, 8F, 8G, and 8H, a detailed description will be given of a method for manufacturing a discrete track (DTR) media according to an embodiment. First, processing of the edge areas and adjacent areas will be described with reference to FIGS. 7A, 7B, 7C, 7D, and 7E. Then, with reference to FIGS. 8A, 8B, 8C, 8D, 8E, 8F, 8G, and 8H, the method for manufacturing a DTR media will be generally described by describing processing of the recording area, while appropriately referring to processing of the edge areas and adjacent areas.

Figure 7A:
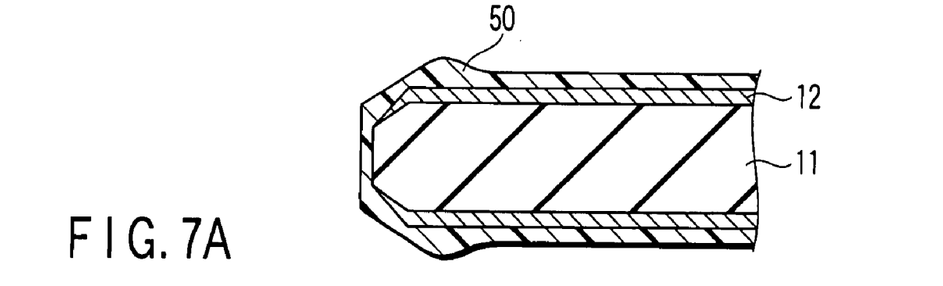
FIGS. 7A, 7B, 7C, 7D, and 7E are cross-sectional views of an edge area and an adjacent area, showing a method for manufacturing magnetic recording media according to an embodiment.

As shown in FIG. 7A, a magnetic film 12 is deposited on the toroidal substrate 11. A resist 50 is spin-coated on the magnetic film 12. In this case, a position-controllable dispenser nozzle is used to avoid applying the resist within 100 µm or more and 2,000 µm or less from the inner peripheral edge of the inner edge area (not shown in FIG. 7A). Spin-coating the resist 50 raises a part of the resist 50 in the outer edge area.

The substrate 11 is, for example, lithium containing crystallized glass. The magnetic film 12 is, for example, what is called a perpendicular double-layer media having a perpendicular magnetic recording layer on a soft magnetic underlayer with a high magnetic permeability. Materials for the soft magnetic underlayer include, for example, a CoZr-based alloy, a CoZrNb-based alloy, and a CoZrTa-based alloy. Materials for the perpendicular magnetic recording layer include, for example, CoCrPt, or the like. An intermediate layer made of a nonmagnetic substance may be provided between the soft magnetic underlayer and the perpendicular magnetic recording layer to block exchange coupling interaction between the soft magnetic underlayer and the perpendicular magnetic recording layer or to control the crystallinity of the perpendicular magnetic recording layer. A material for the intermediate layer is selected from the group consisting of Ru, Pt, Pd, W, Ti, Ta, Cr, Si, alloys containing any of these elements, and oxides and nitrides containing any of these elements. However, the constitution of the magnetic film 12 is not limited to those described above. The resist 50 may be photoresist such as a novolak resin, used for a semiconductor process, or spin-on glass (SOG), but the resist is not limited to them. Methods for applying the resist 50 include spin-coating, dip-coating, spray-coating, and an ink jet process. It is preferable to use the spin-coating, which is excellent in flatness, simplicity, and mass productivity.

Figure 7B:
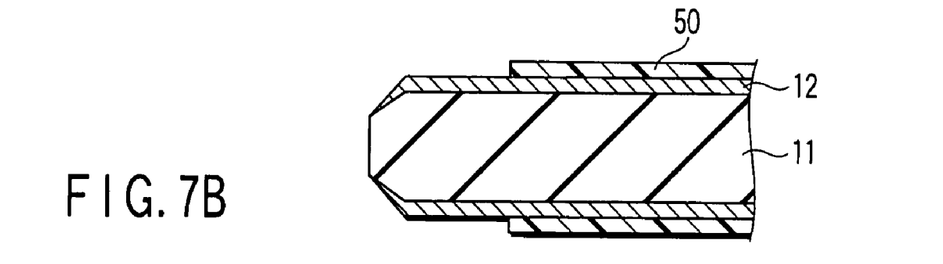

As shown in FIG. 7B, a solvent suitable for the resist 50 is used to edge-rinse a part of the outer edge area which corresponds to the range of 100 µm or more and 2,000 µm or less from the outer peripheral edge to remove the resist. For example, if the resist 50 is SOG, the solvent for edge-rinsing may be ethanol, isopropyl alcohol, cyclohexanone, or the like, but the solvent is not particularly limited.

Figure 7C:
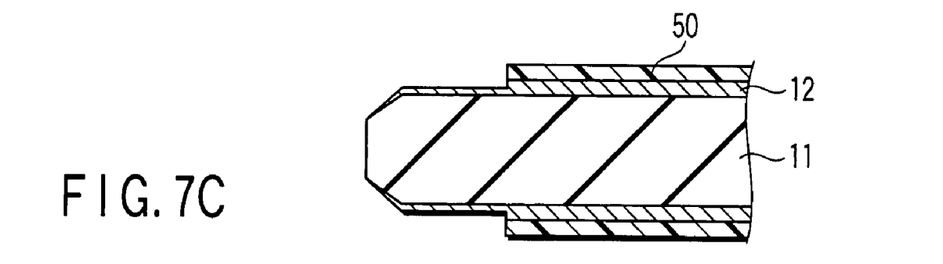

As shown in FIG. 7C, the magnetic film 12 in the edge area is etched and made thinner using the resist 50 as a mask. The magnetic film 12 is etched by, for example, Ar ion milling. In this case, to avoid damaging the magnetic film, the etching based on ion milling is carried out by setting an ion incident angle to 30° and then to 70° to suppress re-deposition. When the etching is carried out at such a steep angle to suppress re-deposition, the side walls of the patterns on the magnetic film are tapered at 40° to 75°.

Figure 7D:
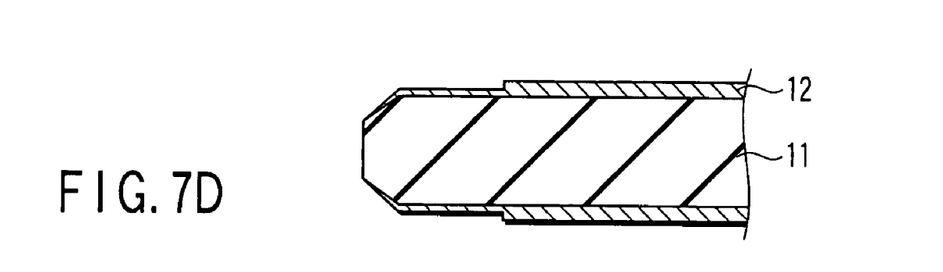

As shown in FIG. 7D, the patterned resist 50 is stripped off. For example, if the resist 50 is SOG, etching may be carried out with $CF_4$, $SF_6$, or the like using an inductively-coupled plasma (ICP) etching apparatus. However, the etching process is not particularly limited. A process for removing impurities from the machined magnetic film, such as washing, may be carried out as required.

Figure 7E:
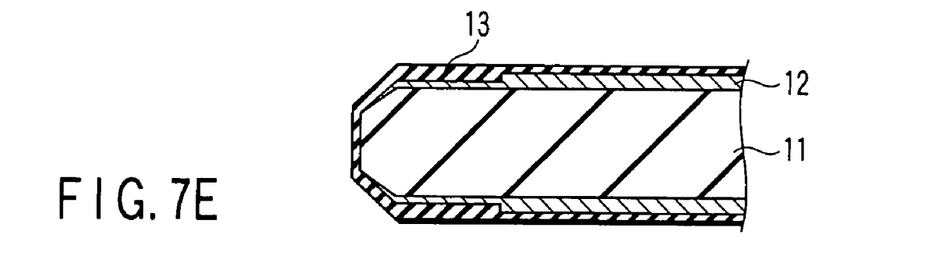

As shown in FIG. 7E, a protective film 13 is deposited. As a result, at least a part of the protective film in the edge area is thicker than that in the adjacent area.

With reference to FIGS. 8A, 8B, 8C, 8D, 8E, 8F, 8G, and 8H, a general description will be given again of the method for manufacturing a DTR media, while describing processing of the recording area, including the imprint process.

Figure 8A:
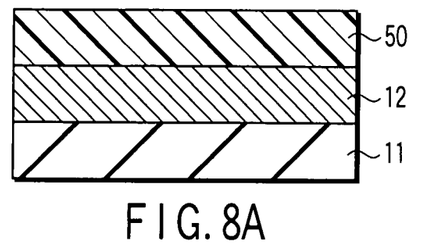
FIGS. 8A, 8B, 8C, 8D, 8E, 8F, 8G, and 8H are cross-sectional views of a recording area, showing the method for manufacturing magnetic recording media according to the embodiment.

As shown in FIG. 8A, a magnetic film 12 is deposited on the toroidal substrate 11. A resist 50 is spin-coated on the magnetic film 12. The resist 50 is selected to be suitable for a process such as etching following an imprint process, in accordance with a high-density magnetic recording media to be produced. The resist 50 also needs to be more flexible than a stamper material to allow patterns of recesses and protrusions on a stamper surface to be reliably transferred in imprinting. The resist 50 further needs to be stable enough to allow the patterns of recesses and protrusions transferred by imprinting to be retained at room temperature. Thus, a material having a glass transition point and a melting point higher that room temperature is selected for the resist 50. More specifically, it is desirable that the material for the resist 50 is flexible enough to allow the patterns of recesses and protrusions of the stamper to be transferred under a load of 500 bar or more and has a glass transition point of at most 100° C. As described above, the resist 50 may be, for example, a photoresist such as a novolak resin, used for a semiconductor process, or SOG, but the resist 50 is not particularly limited.

In this case, the resist is not applied to within 100 μm or more and 2,000 μm or less from the inner peripheral edge of the inner edge area. After the application, the outer edge area is edge-rinsed to remove a raised part of the resist 50 in this area (see the description for FIGS. 7A and 7B).

Figure 8B:
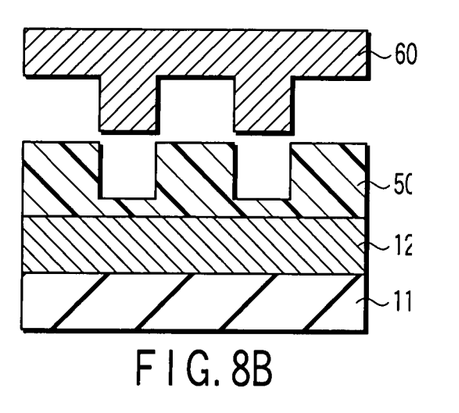

As shown in FIG. 8B, imprinting is performed using a stamper 60 having patterns of recesses and protrusions to transfer the patterns to the resist 50 on the recording area. The resist 50 in the recording area is thus patterned. FIG. 8B shows the state that the stamper 60 is removed after the imprinting. The stamper 60 is made of, for example, nickel.

Figure 8C:
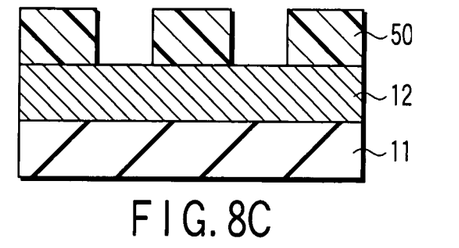

As shown in FIG. 8C, resist residues remaining at the bottoms of the recesses in the patterned resist 50. To remove the resist residues, anisotropic etching is preferably carried out by RIE or ICP.

Figure 8D:
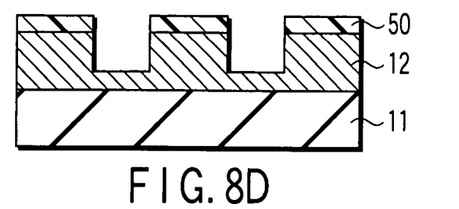

As shown in FIG. 8D, the magnetic film 12 is etched using the protrusions of the patterned resist 50 as a mask. At this time, the magnetic film 12 is etched in the recording area shown in FIG. 8D and in the edge area shown in FIG. 7C. The etching amount of the magnetic film 12 is set to 10 nm or more. The magnetic film 12 is etched by using, for example, Ar ion milling with the ion incident angle varied as described above.

Figure 8E:
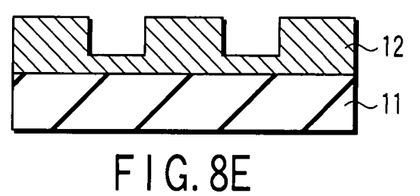

As shown in FIG. 8E, the patterned resist 50 used as the etching mask is stripped off. As described above, at this stage, the resist in the outer edge area is also stripped off (FIG. 7D).

Figure 8F:
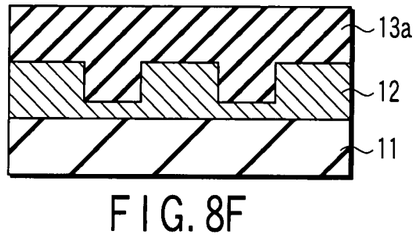
Figure 8G:
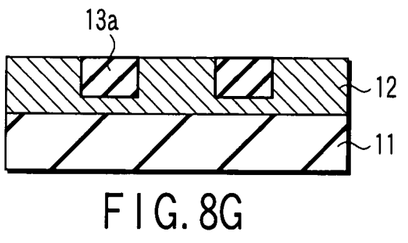
Figure 8H:
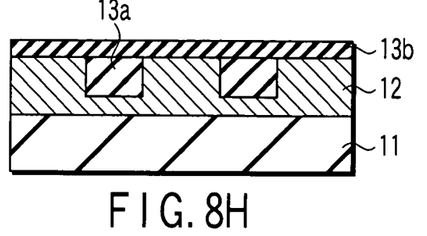

As shown in FIG. 8F, a lower protective film 13a made of amorphous carbon is deposited by sputtering. The lower protective film 13a may be, for example, an insulating film such as $SiO_2$. As shown in FIG. 8G, etch-back is performed to flatten the surface of the lower protective film 13a. As shown in FIG. 8H, an uppermost protective film 13b made of DLC is deposited by CVD. At this time, since electrical conduction can be established in the edge areas, the productive film 13b is improved in quality. This makes the protective film 13 (lower protective film 13a and protective film 13b) thicker in the edge area than in the adjacent area by 10 nm or more. The protective film 13 can thus be made resistant to corrosion and mechanical damage.

Further, processes included in a common method for manufacturing a DTR media are carried out to manufacture a DTR media.

The method for manufacturing a DTR media has been described. However, the method according to the embodiment is also applicable to other media to which the imprint process is applied, such as a discrete bit media and a nano-patterned media.

Figure 9:
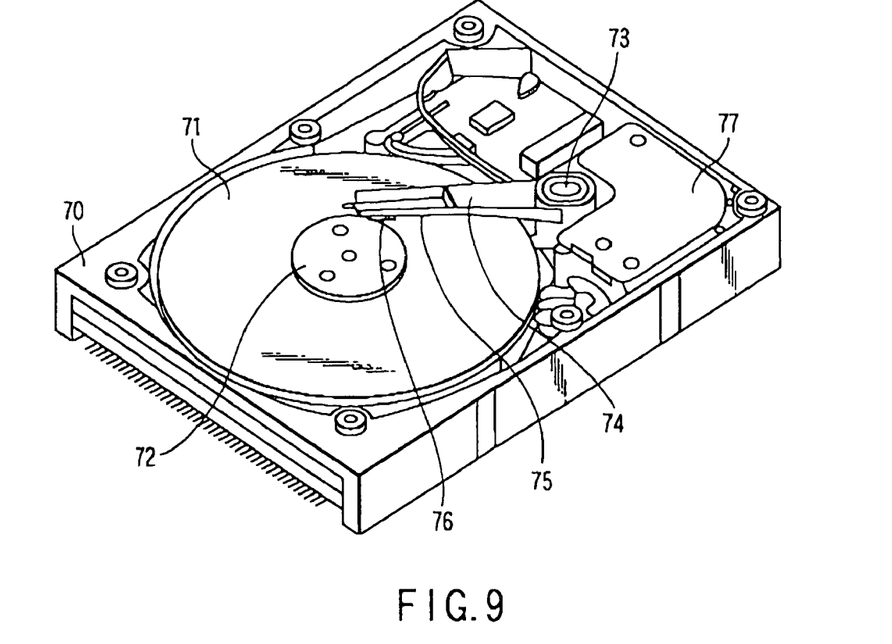
FIG. 9 is a schematic view showing a magnetic recording apparatus according to an embodiment.

FIG. 9 shows a perspective view of a magnetic recording apparatus (hard disk drive) according to an embodiment. The magnetic recording apparatus 70 comprises a discrete track media (DTR media) 71 according the embodiment, a spindle motor 72 that rotates the DTR media 71, a head slider 76 including a magnetic head, a head suspension assembly including a suspension 75 and an actuator arm 74 to support the head slider 76, and a voice coil motor (VCM) 77 serving as an actuator for the head suspension assembly.

The DTR media 71 is rotated by the spindle motor 72. The magnetic head incorporated in the head slider 76 is what is called a combined head including a write head of a single pole structure and a read head that employs a shielded MR element (GMR film, TMR film, or the like). The actuator arm 74 is pivotably attached to a pivot 73. The actuator arm 74 has the suspension 75 attached to one end. The head slider 76 is elastically supported via a gimbal provided in the suspension 75. The actuator 74 has the voice coil motor (VCM) 77 provided at the other end. The voice coil motor (VCM) 77 generates a rotation torque that rotates the actuator arm 74 around the pivot 73, to position the magnetic head on the DTR media 71 while flying over an arbitrary radial position.

As shown in FIG. 1, the servo area 40 is circularly formed in the DTR media 71 to coincide with the locus along which the magnetic head moves. The radius of the circular arc formed by the servo area 40 is equal to the distance from the pivot 73 to the magnetic head. The magnetic head records various digital data on the DTR media 71 in accordance with the perpendicular magnetic recording system.

Figure 10:
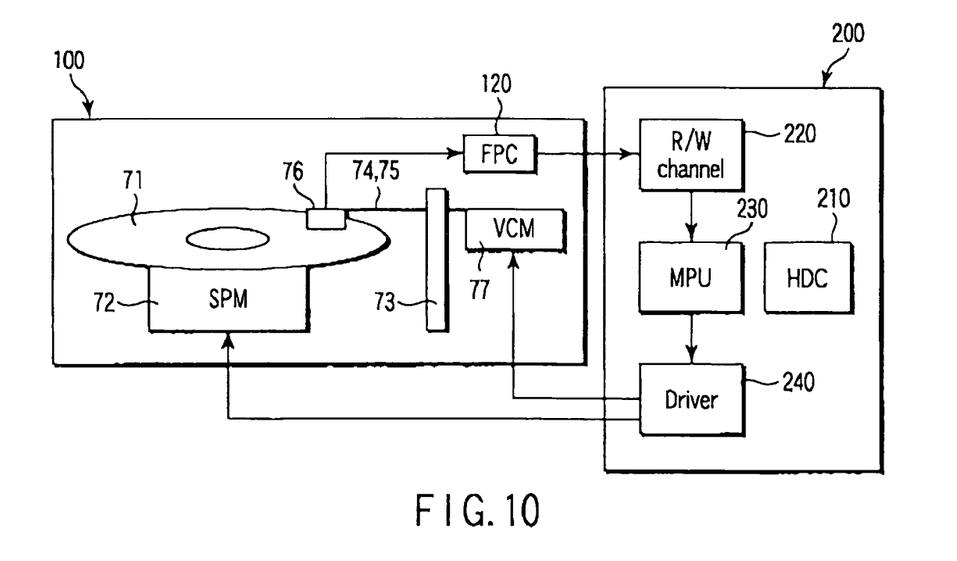
FIG. 10 is a block diagram of the magnetic recording apparatus according to the embodiment.

FIG. 10 shows a block diagram of the magnetic recording apparatus (hard disk drive) according to the embodiment. FIG. 10 shows the head slider only on the top surface of the DTR media. However, for a DTR media with magnetic films (magnetic recording layers) formed on both surfaces as shown in FIGS. 2 and 3, a down head and an up head are provided for the respective surfaces.

The disk drive comprises a main body portion called a head disk assembly (HDA) 100 and a printed circuit board (PCB) 200.

The head disk assembly (HDA) 100 includes, as shown in FIG. 9, the DTR media 71, spindle motor (SPM) 72, pivot 73, actuator arm 74, suspension 75, head slider 76, and voice coil motor (VCM) 77.

A head amplifier (HIC), which is not shown, is fixed on the actuator arm 74 to amplify input signals to and output signals from the magnetic head. The head amplifier is connected to the printed circuit board (PCB) 200 through a flexible cable (FPC) 120. The head amplifier (HIC) provided on the actuator arm 74 as described above enables effective reduction in noise in head signals. However, the head amplifier (HIC) may be fixed to the HDA main body.

Four main system LSIs are mounted on the printed circuit board (PCB) 200. The system LSIs include a disk controller (HDC) 210, a read/write channel IC 220, MPU 230, and a motor drive IC 240.

MPU 230 is a control section of a drive driving system and includes ROM, RAM, CPU, and a logic processing section which cooperatively implement a head positioning control system according to the embodiment. The logic processing section is an arithmetic processing section constituted by a hardware circuit which carries out high-speed arithmetic processes. The relevant operating firmware (FW) is stored in ROM, and the MPU controls the drive in accordance with the firmware.

The disk controller (HDC) 210 is an interface section in the hard disk. The disk controller (HDC) 210 performs interfacing between the disk drive and a host system (for example, a personal computer) and exchange information with MPU, the read/write channel IC, and the motor driver IC to manage the whole drive.

The read/write channel IC 220 is a head signal processing section relating to read/write operations. The read/write channel IC 220 comprises a circuit which switches a channel for the head amplifier (HIC) and which processes read/write signals and the like.

The motor driver IC 240 is a driver section for the voice coil motor (VCM) 77 and spindle motor 72. The motor driver IC 240 controls the spindle motor 72 so that the spindle motor 72 makes constant rotations, and provides VCM 77 with a VCM manipulation variable from MPU 230 in the form of a current value.

EXAMPLES

The present invention will be described more specifically with reference to Examples.

Example 1

A DTR media was produced using the method shown in FIGS. 7A to 7E and 8A to 8H.

A 1.8-inch lithium-based crystallized glass substrate was used as a substrate 11. The substrate 11 was washed and then introduced into a sputtering apparatus. A soft magnetic underlayer, an intermediate layer, and a CoCrPt recording layer were sequentially deposited to form a magnetic layer 12. SOG (OCD T-7 5500T; Tokyo Ohka Kogyo Co., Ltd.) as a resist 50 was spin-coated on the magnetic layer 12 at 5,000 rpm. At this time, the resist 50 was not applied to a part of the inner edge area which corresponded to the range of 100 μm from the inner peripheral edge. After application of the resist 50, a part of the outer edge area which corresponded to the range of 300 μm from the outer peripheral edge was edge-rinsed with cyclohexanone to remove the resist 50.

On the other hand, a nickel stamper 60, having patterns of recesses and protrusions, was prepared. The protrusions on the stamper 60 had a height of 90 nm. The area ratios of recesses in the patterns for each area of the stamper were as follows:

Address portion and preamble portion in the servo area: 50%,

Burst portion in the servo area: 75%, and

Data area: 67%.

Before imprinting, the stamper was coated with a perfluororalkyl derivative as described below so as to be released more smoothly after imprinting. First, to improve the adhesion of the perfluoroalkyl derivative to the nickel stamper, RIE using oxygen gas was carried out for 5 minutes to oxidize the stamper 60. The stamper 60 was then dip-coated with a solution prepared by diluting perfluoropolyether (HOOC—$CF_2$—O—($CF_2$—$CF_2$—O)$_m$—($CF_2$—O)$_n$—($CF_2$—COOH), the perfluoroalkyl derivative, with GALDEN-HT70 (Solvay Solexis K.K.) in order to be coated with perfluoropolyether. The stamper 60 was annealed in a nitrogen atmosphere at 150° C. for 10 minutes.

The treated stamper 60 was pressed against the resist 50 at 2,000 bar for 1 minute for imprinting to transfer the patterns to the resist 50. The resist 50 in the recording area was thus patterned. The recesses in the patterned resist 50 had a depth of about 80 nm. Resist residues remaining at the bottoms of the recesses had a thickness of about 50 nm.

After pattern transfer, RIE was carry out using an ICP etching apparatus to which $CF_4$ gas was introduce so as to set the pressure to about 2 mTorr. The resist residues were thus removed.

After removal of the resist residues, the magnetic film 12 in the recording area and edge area was etched by 10 nm or more by means of Ar ion milling using the protrusions of the patterned resist 50 were used as a mask. In this case, the ion incident angle was set to 30° and then to 70° to taper the side walls of the protruded patterns on the magnetic film 12 at about 40° to 75°.

After processing the magnetic film 12, the remaining patterned resist 50 made of SOG was removed by RIE using $CF_4$ gas.

As a lower protective film 13a for flattening, amorphous carbon was deposited to a thickness of about 100 nm by sputtering. Ar ion milling was then carried out to etch-back the lower protective film 13a to expose the surface of the magnetic film 12. At this time, the ion incident angle was set to 70° to flatten the lower protective film 13a in the edge area as shown in FIG. 2. At this stage, the flat lower protective film 13a of thickness 10 nm or more is formed in the edge area.

As a protective film 13b for corrosion prevention, DLC of thickness about 3 nm was deposited by CVD. Perfluoroether as a lubricant was further dip-coated to a thickness of about 2 nm.

Example 2

Amorphous carbon of thickness about 100 nm was used as a lower protective film 13a. The ion incident angle was set to zero in etching back the lower protective film 13a. The protective film 13 was thus inclined so that its film thickness decreased toward the outer peripheral edge as shown in FIG. 3. Except for these processes, a DTR media was produced in the same manner as in Example 1.

Comparative Example 1

The resist 50 was left in the outer edge area without being edge-rinsed. Only DLC was deposited by CVD to form a protective film. Except for these steps, a DTR media was produced in the same manner as in Example 1.

Example 3

A DTR media was produced in the same manner as in Example 1 except that $SiO_2$ was used as the lower protective film 13a in place of amorphous carbon.

Example 4

A DTR media was produced in the same manner as in Example 2 except that $SiO_2$ was used as the lower protective film 13a in place of amorphous carbon.

Comparative Example 2

A DTR media was produced in the same manner as in Comparative Example 1 except that $SiO_2$ was used as the lower protective film 13a in place of amorphous carbon.

The above Examples are classified as follows.

Example 1: edge-rinsing was performed, the lower protective film was made of carbon, and the protective film in the outer edge area was flat.

Example 2: edge-rinsing was performed, the lower protective film was made of carbon, and the protective film in the outer edge area was inclined.

Comparative Example 1: edge-rinsing was not performed, the lower protective film was made of carbon, and the protective film in the outer edge area was flat.

Example 3: edge-rinsing was performed, the lower protective film was made of $SiO_2$, and the protective film in the outer edge area was flat.

Example 4: edge-rinsing was performed, the lower protective film was made of $SiO_2$, and the protective film in the outer edge area was inclined.

Comparative Example 2: edge-rinsing was not performed, the lower protective film was made of $SiO_2$, and the protective film in the outer edge area was flat.

The DTR media in these Examples were evaluated in the following manner.

(1) Average Thickness of the Protective Film in the Outer Edge Area

The thickness of the protective film (total thickness of the lower protective film 13a and protective film 13b) was measured with a sectional transmission electron microscope (TEM) at a position 300 μm away from the outer peripheral edge.

(2) Rate (bond rate) of a bonding layer in the lubricant and an Id/Ig value The amounts of a bonding layer and a free layer in the lubricant were measured by FT-IR to determine the rate of the bonding layer (bond rate).

The Id/Ig value of DLC, the uppermost protective film, was measured by Raman spectroscopy to evaluate the film quality of DLC. Id/Ig means the ratio of the integrated intensity of a D-band (a vibration peak resulting from a disturbance in the structure) and the integrated intensity of a G-band (a vibration peak of a graphite structure), which are obtained by waveform separation. A smaller Id/Ig value indicates the higher density of the DLC film.

(3) Evaluation of Corrosion Resistance

Each of the DTR media was installed in a drive and taken out a week later. The DTR media were then left in an $SF_6$ atmosphere. Next day, the DTR media were examined for corrosion (white turbidity resulting from corrosion).

Table 1 shows the measurements and indicates the followings.

The protective films of the edge rinsed DTR media in Examples 1, 2, 3, and 4 are thicker in the outer edge area than those of the DTR media in Comparative Examples 1 and 2. The thickness of the protective film in the adjacent area in each of the examples is almost equal to that in the outer edge area measured in Comparative Example 1 or 2. Consequently, the difference in thickness of the protective film between the edge area and the adjacent area is about 20 nm in Examples 1 and 3 and about 12 nm in Examples 2 and 4.

The DTR media in Examples 1 and 2, for which edge-rinsing was performed and amorphous carbon was used as the lower protective film, exhibit a higher bond rate and a smaller Id/Ig value than that in Comparative Example 1. The DTR media in Examples 3 and 4, for which edge-rinsing was performed and $SiO_2$ was used as the lower protective film, exhibit a higher bond rate and a smaller Id/Ig value than that in Comparative Example 2. However, the DTR media in Example 3, in which the protective film was flat, exhibits a lower bond rate and larger Id/Ig value than the DTR media in Example 4, in which the protective film was inclined. Since the DTR media in Examples 1, 2, 3, and 4 could establish electrical conduction in the outer edge area, these media are expected to have a higher amount of $sp^3$ bonded carbon in the DLC protective film and exhibit high film quality. The reason why the DTR media in Example 3, for which $SiO_2$ was used as the lower protective film and the protective film was flat, exhibited a lower bond rate and a larger Id/Ig value would be due to slightly lower conductivity in the outer edge area.

White turbidity resulting from corrosion was observed in the DTR media in Comparative Examples 1 and 2, for which edge-rinsing was not performed. However, no white turbidity resulting from corrosion was observed in the DTR media in Examples 1, 2, 3, or 4, for which edge-rinsing was carried out. These results also indicate that the DTR media in Examples 1, 2, 3, and 4 had high-quality protective films.

TABLE 1

| | Edge rinse | Lower protective film | Surface of protective film | Average thickness of protective film (nm) | Bond rate (%) | Id/Ig | White turbidity |
|---|---|---|---|---|---|---|---|
| Example 1 | Performed | Carbon | Flat | 23 | 83 | 1.6 | Not observed |
| Example 2 | Performed | Carbon | Inclined | 15 | 85 | 1.6 | Not observed |
| Comparative Example 1 | Not performed | Carbon | Flat | 3 | 43 | 3.3 | Observed |
| Example 3 | Performed | $SiO_2$ | Flat | 23 | 67 | 2.2 | Not observed |
| Example 4 | Performed | $SiO_2$ | Inclined | 15 | 80 | 1.7 | Not observed |
| Comparative Example 2 | Not performed | $SiO_2$ | Flat | 3 | 35 | 3.2 | Observed |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium comprising:
   a toroidal substrate, a surface thereof is divided into a recording area located in a central part between an outer peripheral edge and an inner peripheral edge, edge areas located within 100 μm or more and 2,000 μm or less from the outer and inner peripheral edges, respectively, and adjacent areas located between the edge areas and the recording area, respectively;
   a magnetic film on the substrate; and
   a protective film on the magnetic film,
   wherein the magnetic film is thinner in the edge areas than that in the adjacent areas, and at least a part of the protective film in the edge areas is thicker than that in the adjacent areas.

2. The medium according to claim 1, wherein at least a part of the protective film in the edge areas is thicker than that in the adjacent areas by 10 nm or more.

3. The medium according to claim 1, wherein a thickness of the protective film in the edge areas decreases toward the outer peripheral edge or the inner peripheral edge.

4. The medium according to claim 1, wherein the protective film includes a material selected from the group consisting of carbon, $SiO_2$ and $ZrO_2$.

5. The medium according to claim 1, wherein the protective film is formed of a stacked film of two or more types of materials.

6. The medium according to claim 5, wherein the stacked film comprises a lower protective film including amorphous carbon and an uppermost protective film including diamond-like carbon.

7. The medium according to claim 5, wherein the stacked film comprises a lower protective film including $SiO_2$ and an uppermost protective film including diamond-like carbon.

8. A magnetic recording apparatus comprising:

the magnetic recording medium according to claim 1;

a spindle motor which rotates the magnetic recording medium;

an actuator;

an actuator arm actuated by the actuator; and a head slider comprising read and write heads incorporated therein and supported by the actuator arm so as to fly over the magnetic recording medium.

* * * * *